(12) United States Patent
Arunachalam et al.

(10) Patent No.: US 10,327,206 B2
(45) Date of Patent: Jun. 18, 2019

(54) METHOD AND APPARATUS FOR CONTROLLING TCP PACKETS IN COMMUNICATION SYSTEM

(71) Applicant: Samsung Electronics Co., Ltd, Gyeonggi-do (KR)

(72) Inventors: Karthikeyan Arunachalam, Bangalore (IN); Karthikeyan Subramaniam, Bangalore (IN); Jamsheed Manja Ppallan, Bangalore (IN); Muthu Veerappan Alagappan, Gyeonggi-do (KR); Young-Ki Hong, Seoul (KR); Rana Prasad Sahu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 15/286,492

(22) Filed: Oct. 5, 2016

(65) Prior Publication Data

US 2017/0099636 A1  Apr. 6, 2017

(30) Foreign Application Priority Data

Oct. 5, 2015 (IN) ............................ 5330/CHE/2015
Oct. 3, 2016 (IN) ............................ 5330/CHE/2015

(51) Int. Cl.
*H04L 12/28* (2006.01)
*H04W 52/02* (2009.01)
*H04W 28/06* (2009.01)
*H04W 76/25* (2018.01)

(52) U.S. Cl.
CPC ....... *H04W 52/0229* (2013.01); *H04W 28/06* (2013.01); *H04W 76/25* (2018.02); *Y02D 70/00* (2018.01); *Y02D 70/142* (2018.01)

(58) Field of Classification Search
USPC .................................................. 370/394, 412
See application file for complete search history.

(56) References Cited

U.S. PATENT DOCUMENTS

2012/0270538 A1* 10/2012 Meylan ................. H04L 69/162
  455/426.1
2014/0355623 A1* 12/2014 Waclawsky ........... H04L 69/163
  370/465
2017/0099636 A1*  4/2017 Arunachalam ... H04W 52/0229

* cited by examiner

*Primary Examiner* — Phuongchau Ba Nguyen

(57) ABSTRACT

Embodiments herein provide a TCP optimizer (TO) and method for controlling TCP packets due to closure of a TCP connection for power saving. The method includes monitoring TCP closures, for controlling the TCP packets. The TO can be configured to determine a pattern of TCP packets based on a plurality of parameters associated with a TCP connection. Further, the TO can be configured to detect that the pattern corresponds to a TCP closure retransmission or TCP zero window closure category based on a historic pattern of TCP packets. Further, the TO can be configured to terminate the TCP connection. The proposed method allows controlling TCP packets to save power in a mobile device thus improving the life time of a battery of the mobile device.

10 Claims, 18 Drawing Sheets

METHOD AND APPARATUS FOR CONTROLLING TCP PACKETS IN COMMUNICATION SYSTEM

CROSS-REFERENCE TO RELATED APPLICATION(S) AND CLAIM OF PRIORITY

This application claims priority under 35 U.S.C. § 119(a) to Indian Provisional Patent Application Serial No. 5330/CHE/2015, which was filed on Oct. 5, 2015 in the Indian Intellectual Property Office, and to Indian Patent Application Serial No. 5330/CHE/2015, which was filed on Oct. 3, 2016 in the Indian Intellectual Property Office, the entire disclosure of each of these applications is incorporated herein by reference.

TECHNICAL FIELD

The present embodiments herein generally relate to computing devices and more particularly to a Transmission Control Protocol (TCP) Optimizer (TO) and method for controlling TCP packets.

BACKGROUND

Mobile devices are more likely to be used for accessing internet in comparison with other electronic devices providing access to the internet. Accessing internet through Smartphone is common and providing a reasonable battery life is one of the important pre-requisites of Smartphone users. According to various experiments and data, it is verified that the power consumed by a cellular radio contributes around 33 to 50% of complete battery usage for all Smartphone users.

Generally in TCP, retransmission of data packets occur due to packet loss, which is caused by the poor network conditions, poor channel conditions such as congestion, signal degradation, link failure between routers, or the like. However, retransmission of the TCP closure packet i.e., TCP FIN, can occur in optimal network conditions. Considering an example of TCP FIN retransmission in electronic devices, in which a user is browsing through the electronic device and has opened multiple pre-installed applications such as Social Networking Site (SNS) application, instant messaging applications, browser application, or the like. In this scenario, if the user suddenly receives a voice call, the voice call gets priority and all the applications which were running are left idle in background until the voice call is completed. When any one of these applications comes to foreground again, as the user resumes the activity, the application tries to close all idle connections. These delayed closures lead to many uncontrolled TCP FIN packet retransmissions which results in battery drain.

A fully active wireless radio interface consumes significant amount of power, so the transition between different power states such as idle, active, and standby is important when the radio interface is not in use. A waiting or tail time is maintained between two states to prevent a signaling overhead due to frequent radio state switches. A transmission or reception of one packet causes 10~30 seconds of Radio Frequency (RF) active state (power-tail), which consumes large amount of current (150~300 mA) and about 20~30 signaling messages to setup the connection.

In the electronic device, when an application closes the electronic device's socket, the associated connection is not immediately terminated from the lower layers. The underlying library layer tries to reuse the same TCP connection without notifying the application. The main reason for not releasing the socket immediately is to avoid connection establishment overhead such as: TCP three way handshakes, slow start, Secure Socket Layer (SSL) handshake, or the like. Similarly, the server initiated closure is not immediately notified to the application after kernel has received the FIN packet. Hence, the TCP socket closures are not transparent to the application in the electronic device. However, the same behavior of non-transparency is avoided when the application is actively sending or receiving the data.

During delayed closure from the client, if the arrival of the closure packets from the client exceeds the server timeout, the server discards the client closure packets without sending any acknowledgement/RST (reset). This initiates the client to send repeated FIN/SSL closure packets periodically, irrelevant of network conditions thus creating signaling overhead and enabling the radio for a longer duration.

When the application in the electronic device is idle for a period exceeding the server timeout, the server closes the TCP connection. The server closure is not immediately notified to the application. The application realizes the server closure when the application becomes active on the socket. Further, the application releases the application's socket resource with some delay. Thereafter, the TCP kernel in the electronic device sends delayed FIN packets to the server, in order to complete the TCP flow. When the delayed FIN packets reach the server, the server released the socket resources already. Hence, the FIN packets are silently discarded by the server, without sending any RST packet to avoid any wrong interpretation at the electronic device end. This keeps the radio interface in the active state for a longer time and consumes significant amount of battery power as shown in FIG. 1. In case of wired networks, this scenario is tolerable since there is a minor impact in terms of signaling and resource overhead. However, the power loss due to the TCP FIN packets is significant in case of wireless or a cellular network.

Retransmission of TCP zero window probe packets occur when the data download or upload is intervened abruptly from the application. In TCP, the data flow between the client and the server is controlled through a TCP window size. The client and the server exchange their buffer size through the TCP window size. When the client tries to terminate the data flow without terminating the connection, TCP advertises TCP's window size as zero. Further, the server stops sending further data to the client. If the client is inactive after the zero window detection, the server starts sending probe packets periodically and afterwards closes the connection by sending FIN/RST. This creates unnecessary power drain by waking up the radio to send the probe packets from the server.

The above information is presented as background only to help the reader for understanding the present disclosure. Applicants have made no determination and make no assertion as to whether any of the above might be applicable as Prior Art with regard to the present application.

SUMMARY

Aspects of the present disclosure are to address at least the above-mentioned problems and/or disadvantages and to provide at least the advantages described below. Accordingly, The principal object of the embodiments herein is to provide a TCP Optimizer (TO) and method for controlling TCP packets based on a plurality of parameters associated with a TCP connection.

Another object of the embodiments herein is to provide a TO and method for determining a pattern of TCP packets based on the plurality of parameters associated with the TCP connection.

Another object of the embodiments herein is to provide a TO and method for detecting that the pattern corresponds to a TCP closure retransmission category based on a historic pattern of TCP packets.

Another object of the embodiments herein is to provide a TO and method for terminating the TCP connection for saving power in mobile devices.

Another object of the embodiments herein is to provide a TO and method for determining a pattern of the TCP zero window probe packets based on the plurality of parameters associated with the TCP connection.

Another object of the embodiments herein is to provide a TO and method for detecting that the pattern corresponds to closure of zero window probes based on a historic pattern.

Another object of the embodiments herein is to provide a TO and method for optimizing TCP zero window probes for saving power in mobile devices.

Accordingly the embodiments herein provide a method for controlling TCP packets by a TO based on a plurality of parameters associated with a TCP connection.

In an embodiment, the method includes controlling a TCP FIN retransmission packets by the TO.

In an embodiment, the method includes controlling a TCP zero window probe packets.

In an embodiment, the method includes determining a pattern of TCP packets based on the plurality of parameters associated with the TCP connection. Further, the method includes detecting that the pattern corresponds to a TCP closure retransmission category based on a historic pattern of TCP packets. Further, the method includes terminating the TCP connection.

In an embodiment, the method includes determining a pattern of TCP packets based on the plurality of parameters associated with the TCP connection. Further, the method includes detecting that the pattern corresponds to a TCP zero window probe packet category, based on a historic pattern. Further, the method includes terminating the TCP connection.

In an embodiment, the parameters include at least one of static parameters and dynamic parameters.

In an embodiment, the dynamic parameters include a retransmission interval, a retransmission count, a radio interface state, a server dynamics, an application socket close delay, life time of the TCP connection, a connection interval, a type of socket close, and number of zero window probes.

In an embodiment, the static parameters comprise Internet Protocol (IP) address, a port number, and a domain name.

In an embodiment, the historic pattern of the TCP packets includes at least one of, information about Internet Protocol (IP) address, information about port number, information about a domain name, information about a recreation time of the TCP connection, and information about a type of closure.

In an embodiment, terminating the TCP connection includes determining whether a radio interface of the apparatus is enabled, detecting that the apparatus transitions from a deep sleep state to an active state in response to determining that the radio interface of the apparatus is enabled, lingering the socket, and aborting the TCP connection by sending a Reset (RST) packet.

In an embodiment, terminating the TCP connection includes determining whether the radio interface of the apparatus is enabled, detecting that the apparatus transitions from a normal sleep state to the active state in response to determining that the radio interface of the apparatus is enabled, and terminating the TCP connection by sending a TCP FIN packet.

Accordingly the embodiments herein provide an apparatus including a memory, a processor, and a TCP optimizer, coupled to the memory and the processor. The TCP optimizer is configured to control a TCP packets based on a plurality of parameters associated with a TCP connection.

Accordingly the embodiments herein provide a computer program product comprising computer executable program code recorded on a computer readable non-transitory storage medium where the computer executable program code when executed causing the actions which includes controlling TCP packets by a TO based on a plurality of parameters associated with a TCP connection.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
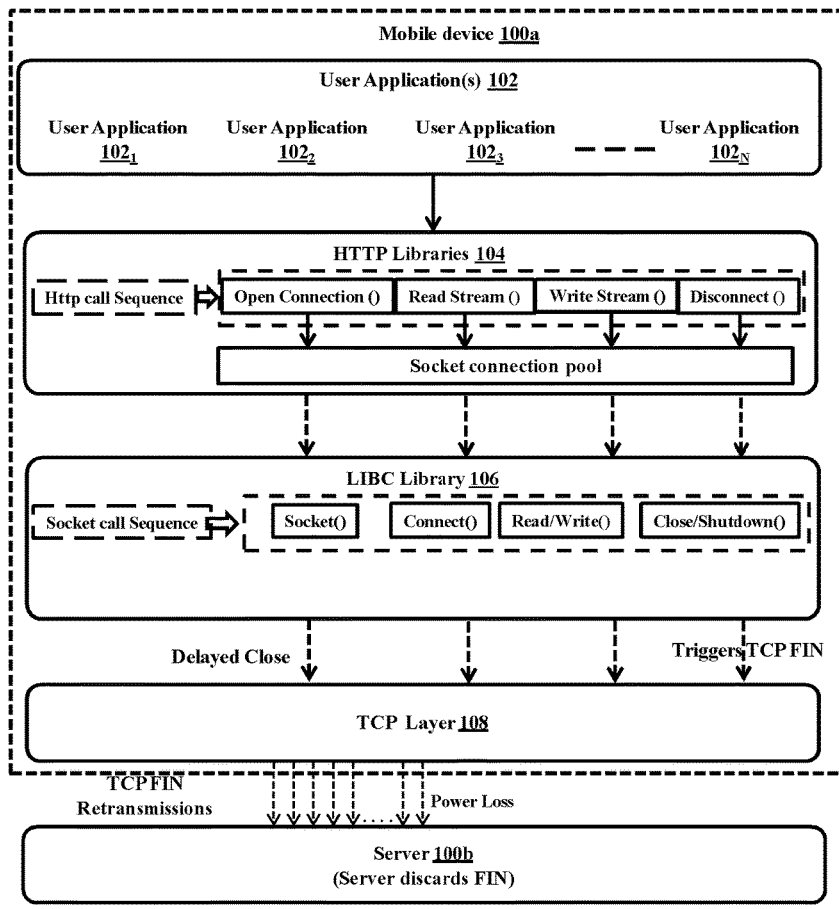
FIG. 1 illustrates a TCP FIN retransmission sequence between a mobile device and a server, according to a prior art.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly the embodiments herein provide a TO and method for controlling TCP packets based on a plurality of parameters associated with a TCP connection. The TO is configured to control TCP packets based on a plurality of parameters associated with a TCP connection. In an embodiment, the TCP packets include TCP FIN packets. In another embodiment, the TCP packets include TCP zero window probe packets.

Unlike conventional methods and systems, the proposed method allows the mobile device to control the TCP FIN retransmission. Further, the periodic retransmission or closure of the FIN packets causes a radio interface of an apparatus (i.e., mobile device) to be in active state for a longer duration thus, draining battery of the apparatus. Further, the proposed method can be used to prevent unnecessary packet communication in energy efficient, a light weight, and an application transparent; and easily deployable in the mobile device. Further, the proposed method can be used to improve life of the battery by minimizing the TCP FIN or last data retransmissions of the TCP connections and improves responsiveness in system application by reducing processing time.

Unlike conventional methods and systems, the proposed method allows the mobile device to detect a pattern of the FIN retransmission for efficiently controlling the packet retransmission overhead by closing the connection at right time without performance degradation due to passive closure of the TCP connections. Further, the proposed method can be used to manage the TCP in a hand held, battery powered device so as to prevent unnecessary radio wake up at the mobile device generated by different applications.

Unlike conventional methods and systems, the proposed method is transparent, backward compatible, light weight, easily deployable across the system, developed without hampering user experience, and without modifying existing TCP kernel code. The proposed method allows power saving by reducing explicit radio wakeups happening due to exponential zero window probing. Further, the proposed method provides a mechanism to prevent resource exhaustion in a server system. The proposed method allows avoidance of unused radio cost incurred to the user and provides a better network bandwidth utilization.

Referring now to the drawings and more particularly to FIGS. 1 through 15, where similar reference characters denote corresponding features consistently throughout the figures, there are shown preferred embodiments.

FIG. 1 illustrates a TCP FIN retransmission sequence between a mobile device 100a and a server 100b, according to a prior art. In an embodiment, the mobile device 100a (i.e., apparatus) can be, for example, a laptop, a desktop computer, a mobile phone, a smart phone, Personal Digital Assistants (PDAs), a tablet, a phablet, a consumer mobile device, a dual display device, or any other mobile device. The mobile device 100a includes user applications $102_1$-$102_N$ (here after referred as the user application(s) 102), Hypertext Transfer Protocol (HTTP) libraries 104, a LIBC library 106, and a TCP layer 108.

In general, the TCP connections are closed after exchange of FIN packets between the mobile device 100a and the server 100b. The user application 102 available in the mobile device 100a exchanges the TCP packets with the server 100b. Further, the information related to socket is stored in the LIBC library 106 of the user application 102. In order to terminate the TCP connection established between the mobile device 100a and the server 100b, the user application 102 sends a socket closure request to the HTTP library 106. In the mobile device 100a, the details about the TCP sockets are hidden from the application 102. The details pertaining to the TCP sockets are maintained by the intermediate libraries, which are not shared with the application 102. When the server timeout expires, the intermediate library sends delayed closure, i.e., FIN packets from the server 100b end and the server 100b silently discards the FIN packets without providing any acknowledgment to the mobile device 100a. Thus, there are repeated FIN retransmissions in the network.

In an example of the TCP FIN retransmission in the mobile device 100a, in which the user after browsing multiple user applications 102 in the mobile device 100a, keeps the mobile device 100a in standby. In this scenario, all the user applications 102 are left idle in the background. When the user applications 102, are in the background for a period exceeding the server timeout, the intermediate library closes the TCP connections corresponding to the user applications 102. When any one of these user applications 102 comes to the foreground again, as the user resumes the activity, the user application 102 tries to close all idle TCP connections. These delayed closures lead to many uncontrolled TCP FIN packet retransmissions which results in the battery drain of the mobile device 100a.

When the user application 102, in the mobile device 100a is idle for the period exceeding the server 100b timeout, the server 100b closes the TCP connection. The server 100b closure is not immediately notified to the user application 102. The user application 102 realizes the server 100b closure when the user application 102 becomes active on the socket. The user application 102 releases the user application 102's socket resource with delay. Thereafter, the TCP kernel in the mobile device 100a sends delayed FIN packets to the server 100b, in order to complete the TCP flow. When the delayed FIN packets reach the server 100b, the server 100b releases the socket resources. Hence, the FIN packets are silently discarded by server 100b, without sending any RST packet to avoid any wrong interpretation at the mobile device 100a endpoint.

Further, the mobile device 100a sends FIN closure packets periodically, irrespective of network conditions. Thus, results in signaling overhead and enabling a radio interface of the mobile device 100a for a longer duration of time, thereby draining the battery of the mobile device 100a.

Figure 2:
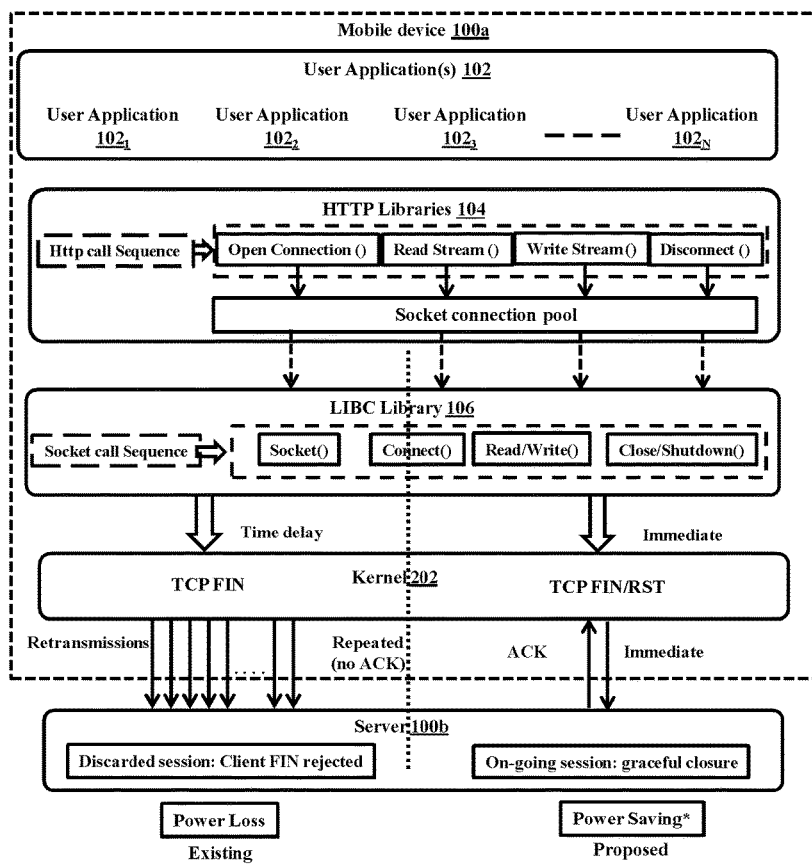
FIG. 2 illustrates a comparison between existing and proposed method for controlling a TCP FIN retransmission, according to an embodiment as disclosed herein.

FIG. 2 illustrates a comparison between conventional and proposed method to control a TCP FIN retransmission, according to an embodiment as disclosed herein. In an embodiment, the mobile device 100a includes the user application 102, the HTTP libraries 104, and a kernel 202. The conventional method is explained in conjunction with the FIG. 1.

Unlike conventional systems and methods, the mobile device 100a can be configured to control a TCP FIN retransmission based on a plurality of parameters associated with a TCP connection. In an embodiment, the parameters include static parameters and dynamic parameters. The dynamic parameters include retransmission interval, retransmission count, radio interface state, server dynamics, application socket close delay, life time of the TCP connection, connection interval, type of socket close, or the like. The static parameters include an Internet Protocol (IP) address, a port number, a domain name, or the like. Further, the functionalities of the mobile device 100a are explained in conjunction with FIG. 5.

Unlike conventional systems and methods, the proposed method can be used to improve the life time of the battery by minimizing the TCP FIN or last data retransmissions of the TCP connection. Further, the proposed method can be used to improve responsiveness in the user application 102 by reducing processing time. Here, in the proposed method, the mobile device 100a can be configured to detect a pattern of the TCP FIN retransmission for efficiently controlling the FIN retransmission overhead by terminating the TCP connection at an appropriate time without resulting in performance degradation due to passive closure of the TCP connections. Further, the proposed method can be used to manage the TCP in a handheld, battery powered device so as to prevent unnecessary radio (i.e., radio interface) wake-up at the mobile device 100a generated by different applications.

Figure 3A:
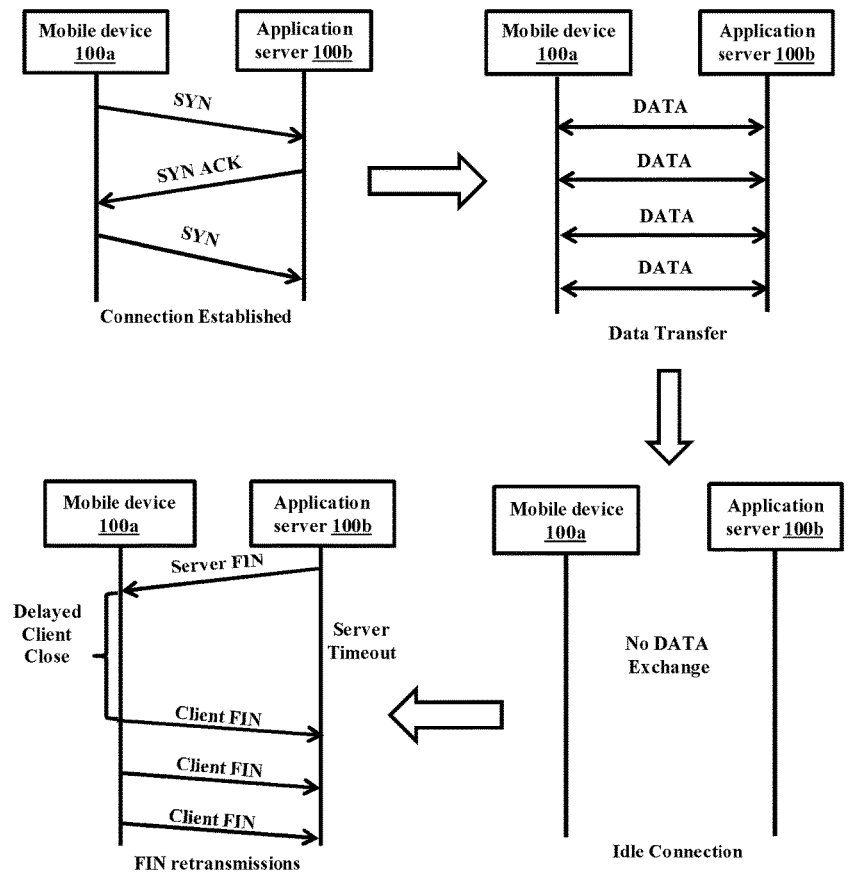
FIG. 3a is an example sequence diagram illustrating a method of a TCP FIN retransmission, according to a prior art.

FIG. 3a is an example sequence diagram illustrating a method of the TCP FIN retransmission, according to a prior art. The FIG. 3a depicts a sequence of signaling messages between the mobile device 100a and the server 100b (i.e., application server 100b).

As depicted in the FIG. 3a, initially, the mobile device 100a establishes the TCP connection with the application server 100b by sending a Synchronization (SYN) packet to the application server 100b. The application server 100b sends the SYN packet to the mobile device 100a. Once the mobile device 100a sends an Acknowledgement (ACK) packet, the TCP connection is established between the mobile device 100a and the application server 100b. After establishing the TCP connection, DATA packets are exchanged between the mobile device 100a and the application server 100b.

Further, the established TCP connection remains open until the connection is explicitly closed or timeout occurs. As shown in the FIG. 3a, during application idle time, the application server 100b closure is not immediately notified to the user application 102. The user application 102 realizes it later or receives the same when the user application 102 becomes active on the socket. This makes the user application 102 to release the user application 102's socket resource and sends the FIN packet to the application server 100b to complete the TCP flow.

By the time these delayed FIN's are sent to the application server 100b, the application server 100b had freed the application server 100b's socket resources. The FIN packets are silently discarded by the application server 100b without sending any RST packet to avoid any wrong interpretation at the mobile device 100a. In case of the SSL closure, the encrypted SSL closure packets from the mobile device 100a are ignored by the application server 100b. The silent discard of the delayed FIN/SSL closure by the application server 100b induces the mobile device 100a to retransmit the packets for prolonged time with certain interval. This keeps the radio interface of the mobile device 100a active for the prolonged time duration and consumes significant battery power.

Figure 3B:
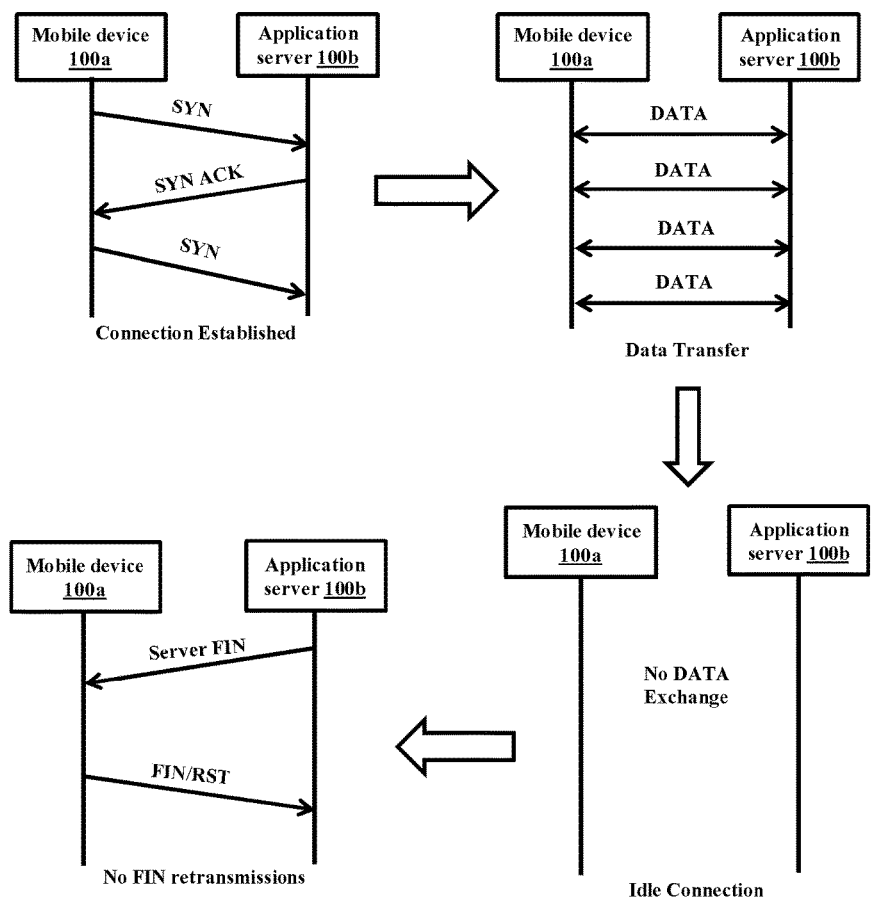
FIG. 3b is an example sequence diagram illustrating a method for controlling a TCP FIN retransmission, according to an embodiment as disclosed herein.

FIG. 3b is an example sequence diagram illustrating a method for controlling the TCP FIN retransmission, according to an embodiment as disclosed herein. The FIG. 3b depicts a sequence of signaling messages between the mobile device 100a and the application server 100b.

Initially, the mobile device 100a establishes the TCP connection with the application server 100b by sending the SYN packet to the application server 100b. The application server 100b sends the SYN packet to the mobile device 100a. Once the mobile device 100a sends the ACK packet, the TCP connection is established between the mobile device 100a and the application server 100b. After establishing the TCP connection, the DATA packets are exchanged between the mobile device 100a and the application server 100b. Unlike conventional systems and methods, the mobile device 100a can be configured to determine the pattern of TCP packets based on the plurality of parameters associated with the established TCP connection. Further, the mobile device 100a can be configured to terminate the TCP connection after detecting that the pattern corresponds to a TCP closure retransmission category based on a historic pattern of TCP packets. Unlike conventional systems and methods, the proposed method can be used to improve the life time of the battery by minimizing the TCP FIN retransmissions of the TCP connection.

Figure 4A:
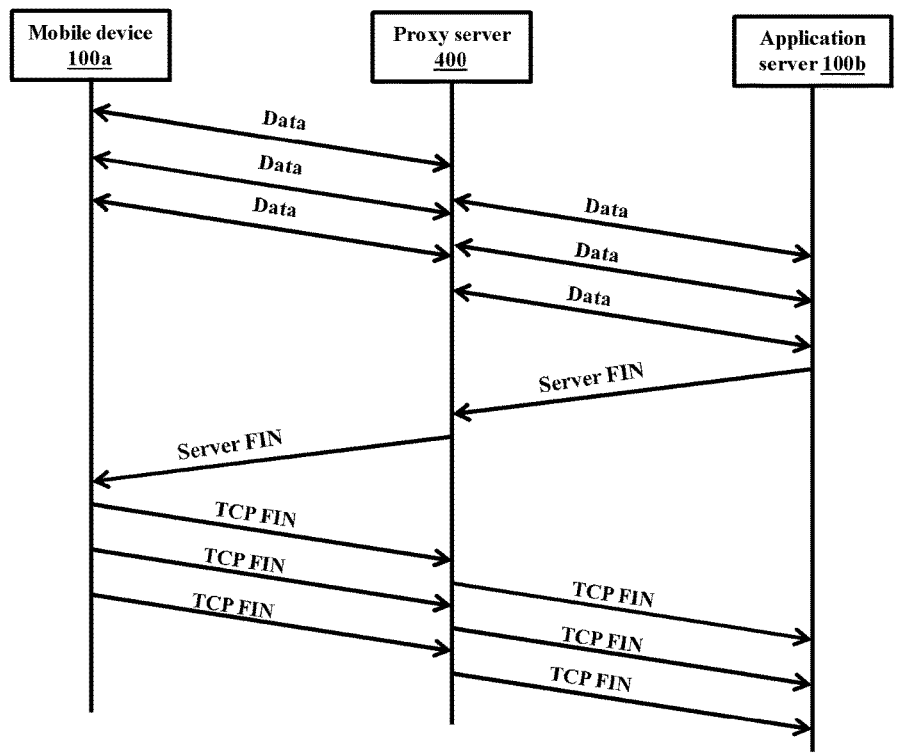
FIG. 4a is an example sequence diagram illustrating a method of a TCP FIN retransmission, according to a prior art.

FIG. 4a is an example sequence diagram illustrating a method of the TCP FIN retransmission, according to a prior art. The FIG. 4a depicts an exchange of a sequence of DATA packets between the mobile device 100a, a proxy server 400, and the application server 100b.

As depicted in the FIG. 4a, initially, the mobile device 100a establishes the TCP connection with the application server 100b through the proxy server 400. After establishing the TCP connection, the DATA packets are exchanged between the mobile device 100a and the application server 100b through the proxy server 400.

Figure 4B:
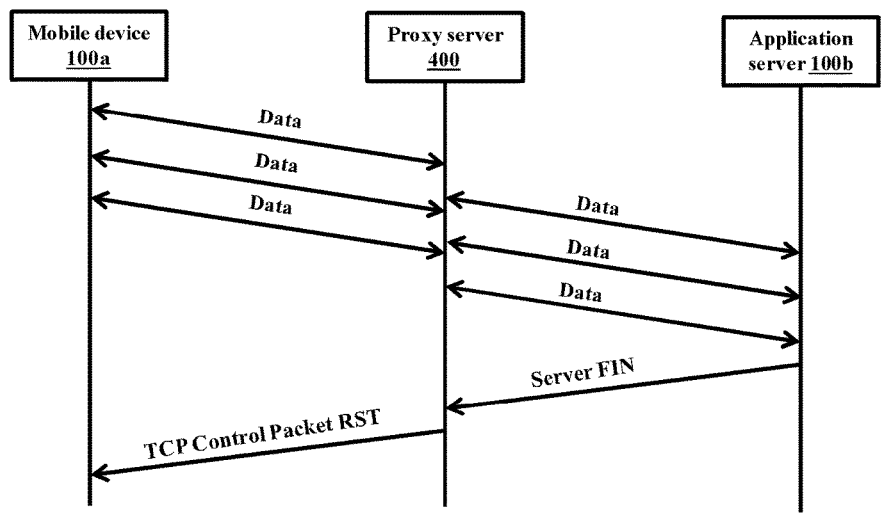
FIG. 4b is an example sequence diagram illustrating a method for controlling a TCP FIN retransmission, according to an embodiment as disclosed herein.

FIG. 4b is an example sequence diagram illustrating a method for controlling the TCP FIN retransmission, according to an embodiment as disclosed herein. The FIG. 4b depicts a sequence of signaling messages between the mobile device 100a, the proxy server 400, and the application server 100b.

As depicted in the FIG. 4b, when the TCP FIN packet is received from the application server 100b, the proxy server 400 sends a TCP control RST packet to the mobile device 100a. This prevents retransmissions of the TCP FIN packets from the user application 102, which causes unnecessary power loss. It is to be noted that, the proposed method can be used to terminate the TCP connection upon determining that the radio interface of the mobile device 100a is enabled. This prevents an additional radio interface wake-up required to send the TCP FIN/RST packet.

Figure 5:
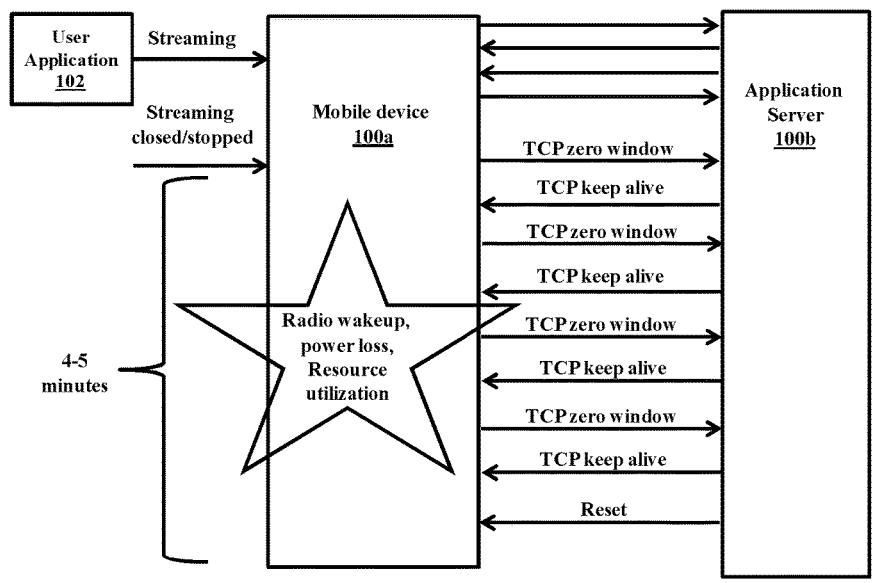
FIG. 5 is an example sequence diagram illustrating a method for retransmitting a TCP zero window probe packet, according to a prior art.

FIG. 5 is an example sequence diagram illustrating a method for retransmitting a TCP zero window probe packet, according to a prior art.

Considering a scenario where the application 102 is downloading or streaming a large amount of data. The TCP zero window probe packet retransmission occurs when a receive buffer of the application 102 is either filled or the application 102 closes or cancels the stream. In such a scenario, the application receiver window size of the mobile device 100a drops to zero and the TCP zero window condition arises. The application server 100b stops transmitting data and starts sending a series of zero window probes to determine whether the TCP window of the mobile device 100a has opened. The above scenario can be realized in real time when the user stops downloading the data during an automatic update of the user application 102, or when video streaming is stopped in a video rendering application due to screen off in the mobile device 100a.

In such scenarios, the application server 100b initiates transmission of a series of zero windows probing packets to the mobile device 100a, which lasts for more than 10 minutes with an interval of 1-30 seconds. Finally, the application server 100b closes or aborts the TCP connection after sending many TCP keep-alive packets for probing the TCP zero window recovery. This causes unnecessary radio wake up at the mobile device 100a and causes wastage of the radio resources. If the user application 102 stops reading the data from receive queues and causes TCP to advertise zero window size to the application server 100b, then the application server 100b is left to hold on to the response data in the application server 100b's sending queue for an indefinite time. Since there is a limit to the operating system kernel 202 memory available for TCP buffers, this may result in DoS (Denial of Service) to legitimate TCP connections by locking up the necessary resources. If this continues for long, the TCP buffers are exhausted and there will be TCP connection blocks, causing legitimate existing TCP connections and new TCP connection attempts to fail.

Usually, when the user application 102 receiver buffer is full, the mobile device 100a advertises zero window size to the application server 100b, that results in transmission of periodic TCP zero window probe packets from the application server 100b to check the window size. The TCP zero window probes allows the user application 102 to stop transmission of the data when the user is not showing interest in downloading or streaming the data. This benefits the user in perspective of cost and bandwidth utilization. However, the TCP connections corresponding to the closed user applications 102 are neither closed by the mobile device 100a nor reused to avoid connection overhead. These TCP connections are left as unattended and at the same time the associated application server 100b periodically keeps sending the TCP zero window probe packets, which keeps the radio interface of the mobile device 100a awake, thereby consuming the battery power.

Since the mobile device 100a is powered from batteries which are limited in size and capacity, managing the energy of the mobile device 100a is paramount. The proposed method provides a design methodology which allows detection of a transmission behavior of the user application 102 based on user context. The proposed method allows undertaking proactive measures/actions to deal with TCP session scenarios involving the TCP zero window packets.

Figure 6:
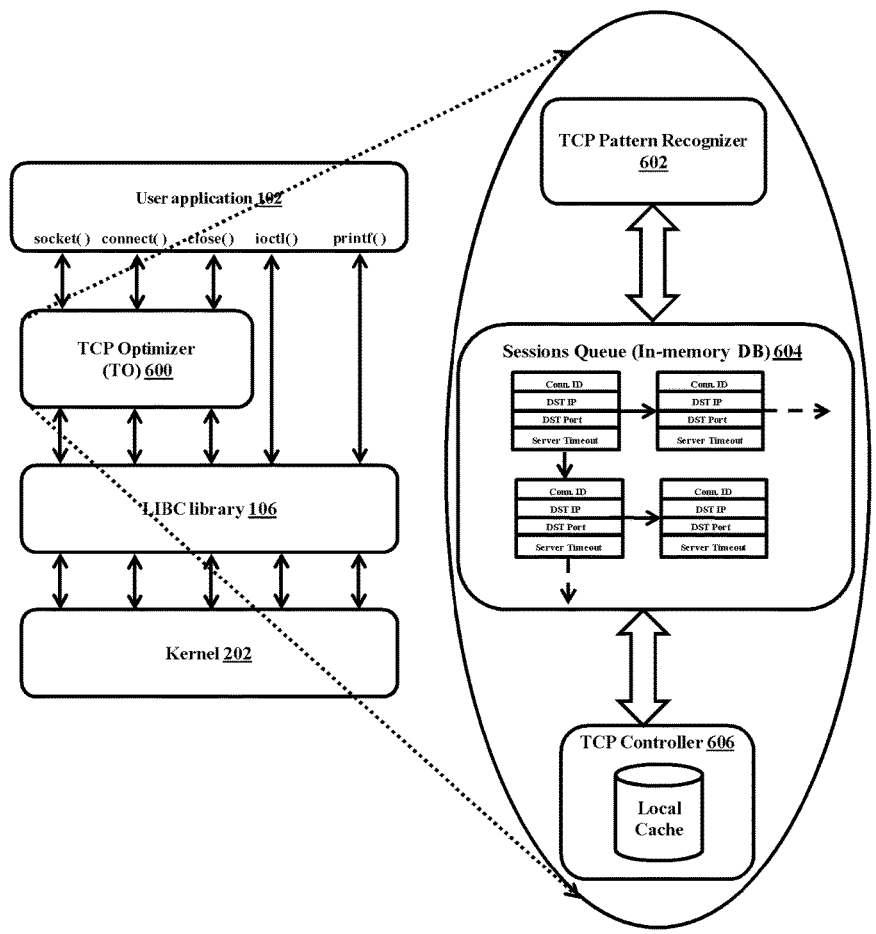
FIG. 6 illustrates a high level overview of a mobile device for controlling TCP packets, according to an embodiment as disclosed herein.

FIG. 6 illustrates a high level overview of the mobile device 100a for controlling the TCP packets, according to an embodiment as disclosed herein. In an embodiment, the mobile device 100a includes the user application 102, a TO 600, the LIBC library 106, and the kernel 202. As depicted in the FIG. 6, the TO 600 in the mobile device 100a is implemented between the user application 102 and the LIBC library 106. The TO 600 occupies lesser amount of memory in context of the overall process. The introduction of the TO 600 does not require any changes in the existing LIBC library 106 and the kernel 202, in order to be implemented in the mobile device 100a.

Further, the TO 600 includes a TCP pattern recognizer 502, a sessions queue (i.e., In-memory database) 504, and a TCP controller 606. The TCP controller 606 also includes a TCP zero window controller (not shown). Initially, the TCP pattern recognizer 602 extracts the TCP related information such as the IP address, the ports, and the domain names; and monitors the type of closure for each type of TCP connection. By using the stored information, the TCP pattern recognizer 602 classifies the TCP connection as a short or a long lived connection, the mobile device 100a initiated closures or the server 100b initiated closures, delayed FIN/RST closure, and TCP zero window probe closures. The TCP controller 606 calculates and controls the TCP connections. The decision is based on classified TCP parameters from the TCP pattern recognizer 602. Based on the calculation, the TCP controller 606 controls the TCP FIN retransmissions and TCP zero window probe packets resulting in reduction of frequent and elongated radio wakeups at the mobile device 100a.

During the user application 102 start up, usually the process symbols are loaded in the memory by a loader. The TO 600 intercepts and preloads TCP socket related symbols such as socket, connect, read, write, close, or the like. Thus, the TO 600 gets plugged into the application address space and initiates the TCP pattern recognizer 602 and the TCP controller 606. The TCP pattern recognizer 602 filters only TCP sockets and odd out other types of sockets such as datagram, raw and sequence sockets from monitoring. After filtering the TCP sockets, the TCP pattern recognizer 602 extracts the TCP information such as socket descriptor, destination IP, port, and domain from the socket; and stores that information for further tracking.

Additionally, a server FIN is verified by checking the state of the TCP connection. Even though, the kernel 202 sends closure notification via POLLHUP or POLLRDHUP, the close is initiated by the server 100b or the mobile device 100a. If the server 100b closes the TCP connection the server 100b's end, the TCP state moves in to CLOSE_WAIT, otherwise, the TCP state moves to FIN_WAIT state. Thus, the TCP state is used to identify the type of closure identified in the TCP pattern recognizer 602. The life time of the connection is calculated by measuring the elapsed time ($E_t$) between the TCP connection establishment ($C_t$) and termination ($T_t$). The elapsed time ($E_t=C_t-T_t$) is used for determining whether the TCP connection is the short or long lived connection.

Further, the TCP controller 606 avoids retransmission of the FIN packets. The number of TCP retransmission ($K_{TCP\_Retra}$) is the sum of DATA and the FIN retransmission, i.e.;

$$K_{TCP\_Retra}=K_{DATA\_Retra}+K_{FIN\_Retra}$$

where $K_{DATA\_Retra}$ is the number of data retransmissions and $K_{FIN\_Retra}$ is the number of FIN retransmissions.

The TCP pattern recognizer 602 classifies the DATA and the FIN retransmissions by using TCP connection states. The retransmissions of the FIN packets happen either in between FIN-WAIT1 to CLOSED or CLOSE-WAIT to CLOSED states respectively. A TCP connection can be either in CLOSE-WAIT or FIN-WAIT1 depending on whether the mobile phone 100a or the server 100b; initiated the closure. The duration of the TCP FIN retransmission depends on how long the TCP connection exists in between these states.

$$T_{FIN\_Retra} \alpha h(t_{CLOSED}-t_{FIN\_WAIT1}) \text{ or}$$

$$T_{FIN\_Retra} \alpha h(t_{CLOSED}-t_{CLOSE\_WAIT})$$

where $t_{CLOSED}$, $t_{CLOSE\_WAIT}$ and $t_{FIN\_WAIT1}$ are the timestamp of the CLOSED, CLOSE-WAIT and FIN-WAIT1 TCP states respectively.

The TCP controller 606 is initiated when the TCP pattern recognizer 602 notifies the TCP state change. The TCP pattern recognizer 602 counts the number TCP FIN retransmissions and stores the TCP connection information such as the IP, the port, the domain, or the like in the TCP pattern recognizer 602's local cache for the first TCP connection. Later, when similar kind of pattern occurs, then the TCP controller 606 lingers socket and abort the TCP connection by sending RST. Thus, the TCP FIN retransmissions are avoided in the TO 600.

The FIG. 6 shows a limited overview of the mobile device 100a but, it is to be understood that another embodiment is not limited thereto. Further, the mobile device 100a can include different units communicating among each other along with other hardware components or software components on the hardware components.

Figure 7:
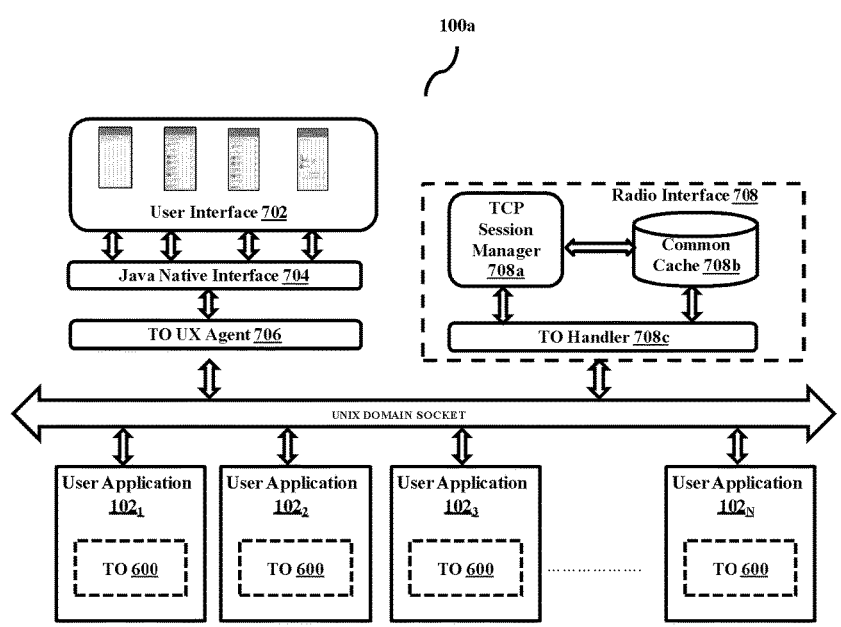
FIG. 7 is another high level architecture, depicting an interaction between different units of a mobile device, according to an embodiment as disclosed herein.

FIG. 7 is another high level architecture, depicting the interaction between different units of the mobile device 100a, according to an embodiment as disclosed herein. In an embodiment, as depicted in the FIG. 7, the mobile device 100a includes a user interface 702, a java native interface 704, a TO UX agent 706, a radio interface 708, and the TO 600 for each of the user application 102 available in the mobile device 100a. The radio interface 708 includes a TCP session manager 708a, a common cache 708b, and a TO handler 708c.

The user interface 702 displays the information about the TCP connection, the parameters of the TCP connection, the pattern of the TCP packets, and the historic pattern of TCP connection obtained from the TO 600. The user interface 702 allows either enabling or disabling the TO 600. The user interface 702 is also used to display statistical information to the user. The user interface 702 is an optional interface, which is designed for giving more control to the user. The java native interface 704 can be configured to access the lower level Application Programming Interface (API) of the TO UX agent 706 and provides access to the user interface 702 for obtaining statistics. Further, the TRO UX agent 706 can be configured to collect parameters of the TCP connection including the information from the radio interface 708.

The TCP session manager 708a can be configured to store the parameters of the TCP connection.

Further, the common cache 708b can be configured to store and retrieve the DNS information. Further, the TO handler 708c can be configured to handle the IPC requests and perform load balancing among the worker threads. The TO 600 controls the TCP packet retransmission from the respective application installed in the mobile device 100a. The TCP connections corresponding to the TCP closure retransmission category are terminated when the radio interface 708 is enabled.

The FIG. 7 shows a limited overview of the mobile device 100a but, it is to be understood that another embodiment is not limited thereto. Further, the mobile device 100a can include different units communicating among each other along with other hardware or software components. By way of illustration, both an application running on the mobile device 100a and the mobile device 100a can be the component.

Figure 8:
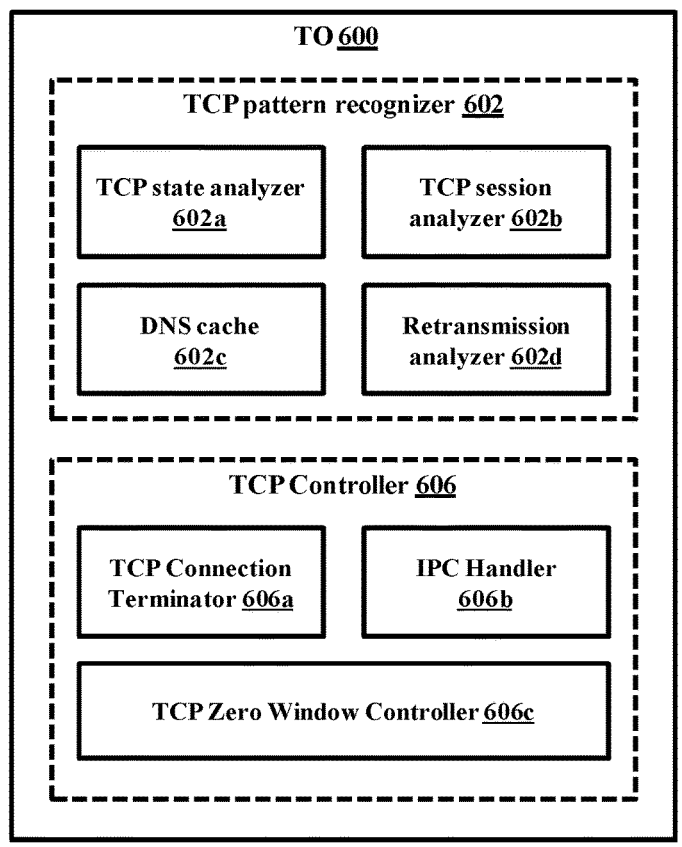
FIG. 8 illustrates various units of a TO, according to an embodiment as disclosed herein.

FIG. 8 illustrates various units of the TO 600, according to an embodiment as disclosed herein. The TO 600 includes the TCP pattern recognizer 602 and the TCP controller 606. In an embodiment, the TCP pattern recognizer 602 includes a TCP state analyzer 602a, a TCP session analyzer 602b, a Domain Name Server (DNS) cache 602c, and a retransmission analyzer 602d. The TCP controller 606 includes a TCP connection terminator 606a, an IPC handler 606b and a TCP zero window controller 606c.

The TCP state analyzer 602a can be configured to extract the parameters related to the TCP connection such as like the IP address, the port number, and the domain name, and monitors the type of closure for each of the TCP connection. By using the parameters of the TCP connection, the TCP state analyzer 602a can be configured to classify the TCP connection as either the short or long lived connection, the client/server initiated closures, the eligible zero window probes candidates, and the delayed FIN/RST candidates. Further, the TCP session analyzer 602b can be configured to detect states of the TCP, the type of closure, and life time of the TCP connection.

Further, the TCP session analyzer 602b can be configured to maintain the TCP session information such as the socket descriptor, the IP, the port, connection recreation interval, and periodic/non periodic data flow. Further, the DNS cache 602c can be configured to store and retrieve DNS information such as the domain name, the IP address, and the TTL. Further, the retransmission analyzer 602d can be configured to track the number of retransmissions, the retransmission intervals, and the RTT.

Further, the TCP connection terminator 606a can be configured to linger the socket for terminating the TCP connection, post determining that the radio interface 708 of the mobile device 100a is enabled. Further, the IPC handler 606b can be configured to communicate with the radio interface 708 for determining whether the radio interface of the mobile device 100a is enabled or disabled. Further, the functionalities of the TCP controller 606 are explained in conjunction with the FIG. 6.

Further, the TCP zero window controller 606c allows controlling the series of TCP zero window probe packets from the application server 100b in an event the application 102 receive buffer is filled or the application 102 stops receiving the data or cancels a buffering stream. When the data transfer from the application server 100b is prevented, the pattern recognizer 602 gathers information such as advertised TCP window size, number of zero window probes, number of retransmissions, or the like.

The TCP zero window controller 606c is notified when the pattern recognizer 602 detects the TCP zero window probe packets. On receiving the notification, the TCP zero window controller 606c calculates the idle time from the last data transfer. The idle time is calculated as $L_t$–$CUR_t$, based on last data transfer time stamp ($L_t$) and current time stamp ($CUR_t$). Once the idle time exceeds the threshold time ($TH_t$), the TCP zero window controller 606c closes/aborts the TCP connection.

The FIG. 8 shows a limited overview of the TO 600 but, it is to be understood that another embodiment is not limited thereto. Further, the TO 600 can include different units communicating among each other along with other hardware or software components. By way of illustration, both an application running on the TO 600 and the TO 600 can be the component.

Figure 9A:
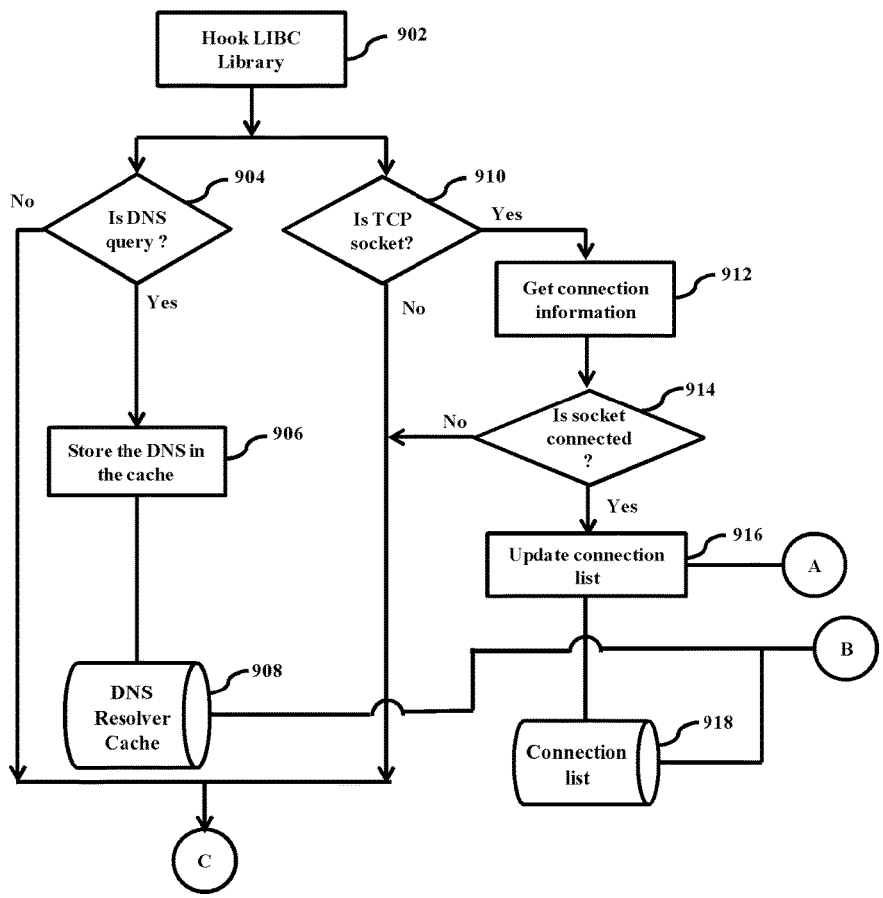
FIGS. 9A and 9B are a flow chart illustrating a method for controlling TCP packet retransmission by a TO, according to an embodiment as disclosed herein.
Figure 9B:
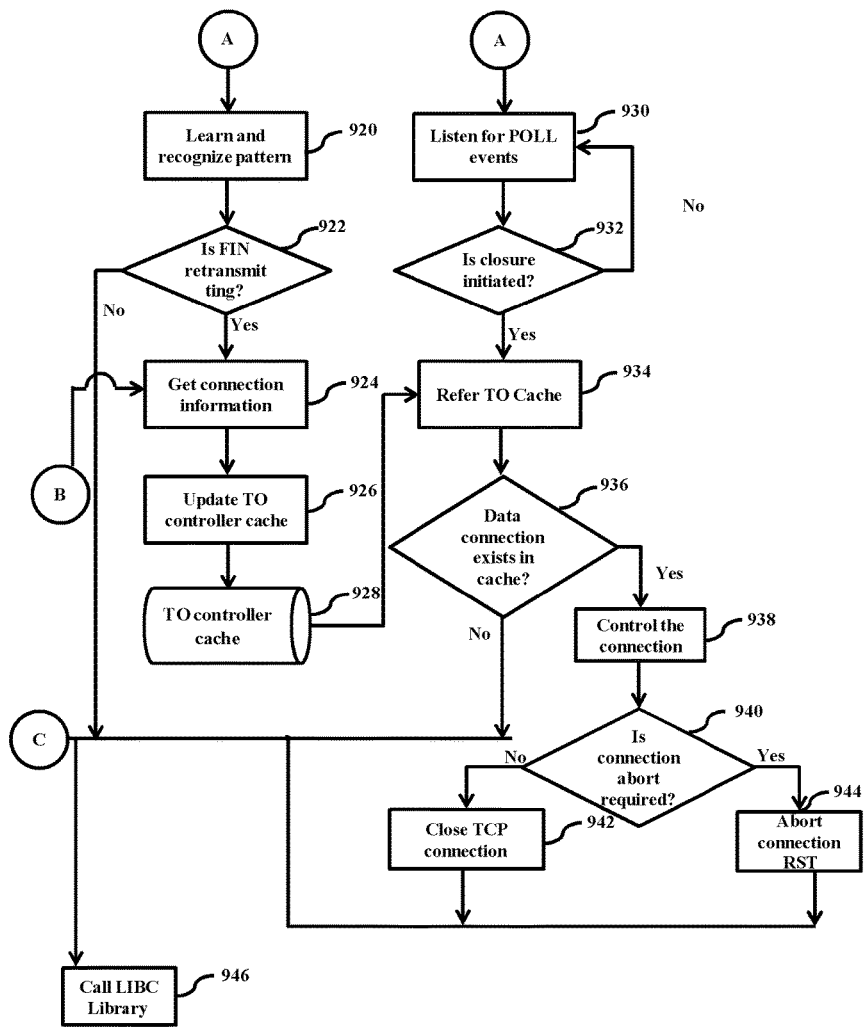

FIGS. 9A and 9B are a flow chart illustrating a method for controlling the TCP packet retransmission by the TRO 600, according to an embodiment as disclosed herein. Consider a scenario, in which the mobile device 100a is attempting to establish the TCP connection with the server 100b.

At step 902, the method includes hooking LIBC API. When the user application 102 starts, the loader loads default symbols into process address space. The TO 600 modifies the loader default by setting the environment variable LD_PRELOAD. The LD_PRELOAD instructs loader to preload TCP socket related symbols such as socket, connect, close and also DNS related symbols such as getaddrinfo, gethostbyname, android_getaddrinfo from the TO 600 shared library. At step 904, if it is determined that the DNS query then, at step 906, the method includes storing the DNS in the cache.

At step 908, the method includes storing the DNS in the DNS resolver cache. Usually the user application 102 generates the DNS query for resolving the domain name before establishing the TCP connection with the server 100b. Based on the DNS query response, the user application 102 selects a socket family (IPV4/IPV6) and IP address to create the TCP socket. The pattern recognizer 602 extracts the resolved domain name's IP address(es) from the DNS query response and stores it in DNS resolver cache for mapping domain name with the IP address. The TO 600 hooks the LIBC library 106. Thus, the TO 600 gets plugged into the user application 102 address space and initiates the pattern recognizer 602 and the TCP controller 606.

At step 910, if it is determined that the socket is TCP, then, at step 912, the method includes obtaining the TCP connection information. The TCP sockets are filtered out from all available socket types such as datagram, raw, and sequence sockets. At step 914, if it is determined that the socket is connected then, at step 916, the method includes updating the connection list. At step 918, post filtering the TCP sockets, the pattern recognizer 602 extracts the socket related information and stores them into the connection list with domain name mapping of the DNS resolver Cache. The determination of whether the TCP connection is established for the first time is ascertained by obtaining the parameters of the TCP connection from the local cache in the TCP controller 606.

At step 920, the pattern recognizer 602 analyzes and learns the behavior of the TCP connection. The pattern recognizer 602 classifies the connections into periodic data flow and non-periodic data flow connection based on the last data sent or received timestamp. At step 922, if it is determined that the pattern of the TCP connection corresponds to the TCP FIN retransmission category then, at step 924, the method includes obtaining information relating to the TCP connection. The pattern recognizer 602 further examines the TCP connection and identifies various patterns that cause unwanted radio wakeups. The pattern recognizer 602 detects the retransmissions with the help of TCP connection states.

At step 926, the method includes updating the cache of the TCP controller 606. Whenever the pattern is identified, at step 928, the domain information of that TCP socket is stored in the cache of the TCPO controller 606. As the TO 600 analyses and stores the domain information, the TCP retransmission controller 606 efficiently handles the closure of the sockets connected to these domains. The TCP controller 606 evaluates whether the closure of the TCP connection is initiated by the mobile device 100a or the server 100b, whether the user application 102 is active on the TCP socket, whether the mobile device 100a is in a sleep mode, or the like. Based on this information, the TCP controller 606 decides whether to close/abort the TCP connection.

At step 930, the method includes listening for polling events. At step 932, if it is determined that the closure is initiated, then, at step 934, the method includes referring to the local cache of the TCP controller 606. At step 936, if it is determined that the TCP connections exist in the local cache then, at step 938, the method includes controlling the TCP connection. At step 940, if it is determined that a connection abort is not required then, at step 942, the method includes controlling the TCP connection by closing the TCP connection by sending the FIN packet. At step 946, the method includes calling LIBC library 106. At step 940, if it is determined that the connection abort is required then, at step 944, the method includes controlling the TCP connection by aborting the TCP connection by sending the RST packet and step 946 is performed.

At step 904, if it is determined that the DNS query is unavailable then, the method performs step 946. At step 910, if it is determined that the TCP socket is unavailable then, the method performs step 946. At step 914, if it is determined that the socket is not connected then the method performs step 946. At step 922, if it is determined that the FIN is not retransmitting then, the method performs step 946. At step 932, if it is determined that the closure is not initiated then, the method performs step 930. At step 936, if it is determined that the data connection does not exist in the cache then, the method performs step 946.

In an embodiment, when, the user application 102 actively sends or receives data packets and closes the TCP connection normally, the power usage of the TCP session is represented as follows:

$$P_{tcp-session} = P_{radio-setup} + P_{tx-rx} + P_{tail} \qquad \text{Equation-1}$$

where $P_{tcp-session}$ is the total power consumption in a TCP session, $P_{radio-setup}$ is the power consumption during the radio wakeup, $P_{tx-rx}$ is the power consumption for transmission/reception of a data packet and $P_{tail}$ is the power consumption for tail state energy.

The kernel 202 maintains the retransmission timer for each of the TCP connection. Once the timer expires, the kernel 202 retransmits the TCP segment, which is not acknowledged from the kernel 202's remote end. The kernel 202 keeps retransmitting the unacknowledged TCP segment at certain time intervals until the retransmission count reaches the maximum number of retries. This is how the retransmission occurs. For a FIN retransmission scenario, power consumption can be derived. Considering the scenario of the FIN retransmission occurs for N times, the power consumption is as follows:

$$P_{FIN\_Retra} = \sum_{i=1}^{N}\left(P_{i_{radio-setup}} + P_{i_{FIN}} + P_{i_{tail}}\right) \quad \text{Equation-2}$$

where $P_{i_{radio-setup}}$ is the power consumption at $i^{th}$ radio wakeup, $P_{i_{FIN}}$ is the power consumption at $i^{th}$ FIN transmission and $P_{i_{tail}}$ is the power consumption at the $i^{th}$ tail energy state.

However, if the FIN retransmissions occur during the period at which the radio is in the active state, there is no battery drain. When the retransmission interval between two consecutive TCP segments exceed the radio tail time, the radio wake up occurs as explained below:

$$K_{Radio\_Wakeups} = \sum_{n=1}^{N} F(\Delta t_{FIN\_Retra} > t_{radio\_tail}) \quad \text{Equation-3}$$

where F(A>B)=1, if A>B else 0, $\Delta t_{FIN\text{-}Retra}$ is the time between two successive FIN retransmissions, $t_{radio\_tail}$ is the radio tail time, N is the number of FIN retransmissions, and $K_{Radio\_Wakeups}$ is the number of radio wakeups.

Amongst N TCP FIN retransmissions, if it is considered that in M scenarios, the actual radio wakeups happen as given in equation-3, and for simplicity if it assumed that on an average a user browses K+1 number of applications simultaneously and K number of applications that go to background, the total power consumption without the TRO is given as follows:

$$P^T = \sum_{j=1}^{K}\left(\sum_{i=1}^{M(K)}\left(P^j_{i_{radio-setup}} + P^j_{i_{FIN}} + P^j_{i_{tail}}\right)\right) \quad \text{Equation-4}$$

where M(K) is the number of independent radio wakeups in K applications going to background.

Applying the TO 600, the TCP sessions can be successfully terminated by sending the FIN/RST packet at the outset. Hence, the power consumption with the TO 600 can be represented as follows:

$$P_{TRO}^T = (P_{avg\text{-}radio\text{-}setup} + P_{avg\text{-}FIN} + P_{avg\text{-}tail}) \quad \text{Equation-5}$$

In order to determine the power consumption of the mobile device 100*a* incorporating the TO 600, a retransmission scenario amongst the M retransmissions is considered. Now, the power saving estimate due to the TO 600 solution is as follows:

$$\tau = \left(\frac{P^T - P^T_{TO}}{P^T}\right) \quad \text{Equation-6}$$

This indicates power saving at the instant of the application usage.

The various actions, acts, blocks, steps, or the like in the flow chart may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 10:
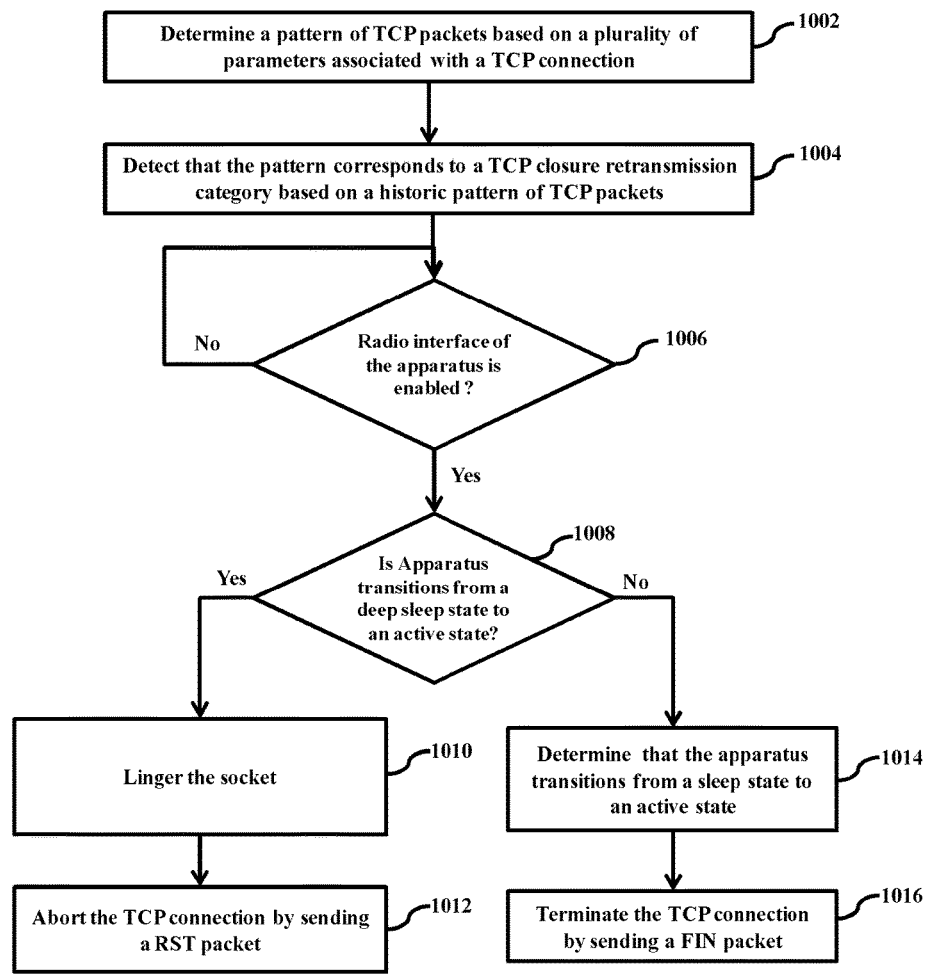
FIG. 10 is another flow chart illustrating a method for controlling TCP packet retransmission by a TO, according to an embodiment as disclosed herein.

FIG. 10 is another flow chart illustrating a method for controlling the TCP packet retransmission by the TO 600, according to an embodiment as disclosed herein. At step 1002, the method includes determining the pattern of TCP packets based on the plurality of parameters associated with the TCP connection. The method allows the TO 600 to determine the pattern of TCP packets based on the plurality of parameters associated with the TCP connection. In an embodiment, the pattern of TCP packets is the number of FIN retransmissions.

In an embodiment, the parameters include at least one of the static parameters and the dynamic parameters. The static parameters include the IP address, the port number, the domain name, or the like. The dynamic parameters include the retransmission interval, the retransmission count, the radio interface state, the server dynamics, the application socket close delay, the life time of the TCP connection, the connection interval, the type of socket close, or the like.

At step 1004, the method includes detecting that the pattern corresponds to the TCP closure retransmission category based on the historic pattern of the TCP packets. The method allows the TO 600 to detect that the pattern corresponds to the TCP closure retransmission category based on the historic pattern of the TCP packets. In an embodiment, the historic pattern of the TCP packets comprises information about IP address, information about port number, information about a domain name, information about a recreation time of the TCP connection and information about a type of closure.

If it is determined, at step 1006, that the radio interface 708 of the mobile device 100*a* is not enabled then, the step 1006 is performed. If it is determined, at step 1006 that the radio interface 708 of the mobile device 100*a* is enabled then, at step 1008, the method includes determining whether the mobile device 100*a* transitions from a deep sleep state to an active state. The method allows the TO 600 to determine whether the mobile device 100*a* transitions from the deep sleep state to the active state. If it is determined, at step 1008, that the mobile device 100*a* transitions from the deep sleep state to the active state then, at step 1010, the method includes lingering the socket. The method allows the TO 600 to linger the socket.

At step 1012, the method includes aborting the TCP connection by sending the RST packet. The method allows the TO 600 to abort the TCP connection by sending the RST packet. If it is determined, at step 1008, that the mobile device 100*a* does not transition from the deep sleep state to the active state then, at step 1014, the method includes determining that the mobile device 100*a* transitions from a sleep state to the active state. The method allows the TO 600 to determine that the mobile device 100*a* transitions from the sleep state to the active state. At step 1016, the method includes terminating the TCP connection by sending the FIN packet. The method allows the TO 600 to terminate the TCP connection by sending the FIN packet.

The various actions, acts, blocks, steps, or the like in the flow chart may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 11:
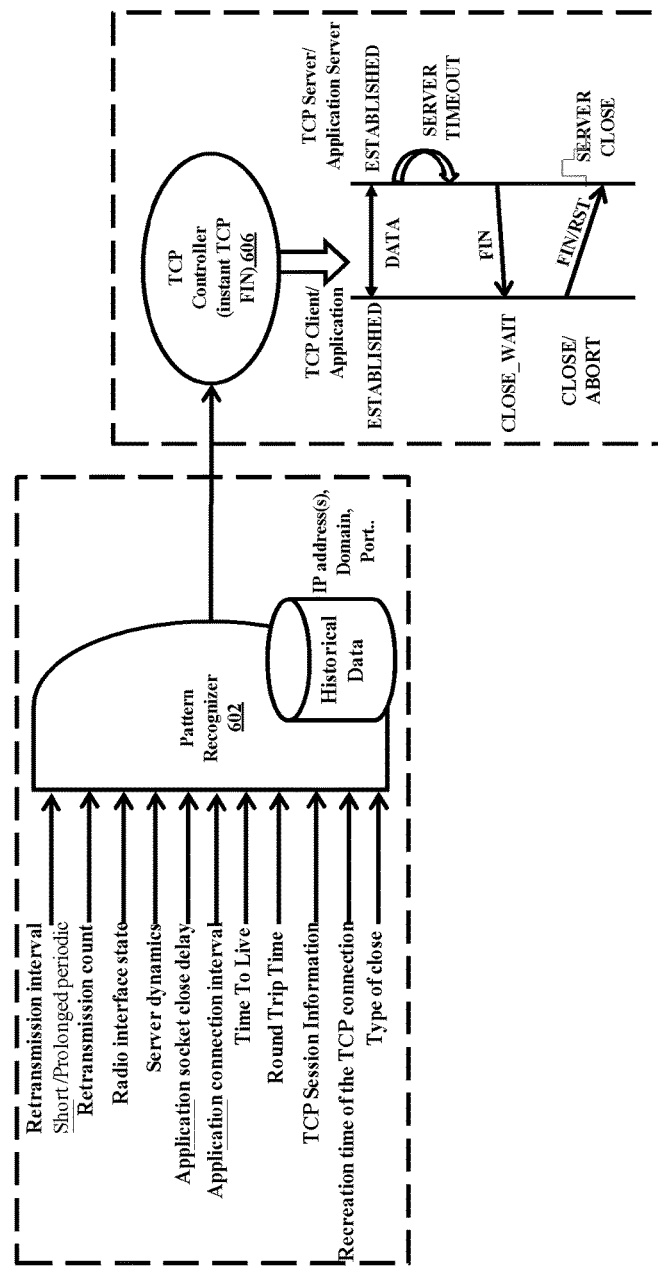
FIG. 11 illustrates an internal architecture of a TO, according to an embodiment as disclosed herein.

FIG. 11 illustrates an internal architecture of the TO 600, according to an embodiment as disclosed herein. As depicted in the FIG. 11, the TO 600 includes the TCP pattern recognizer 602 and the TCP controller 606. The TCP pattern recognizer 602 and the TCP controller 606, in tandem, control the retransmissions of the FIN and TCP zero window probe packets respectively.

The TCP pattern recognizer 602 can be configured to determine the pattern of the TCP FIN packets based on the parameters associated with the TCP connection. The parameters include at least one of the static parameters and the dynamic parameters. The static parameters include the IP address, the port number, the domain name, or the like. The dynamic parameters include the retransmission interval, the retransmission count, the radio interface state, the server dynamics, the application socket close delay, the life time of the TCP connection, the connection interval, the type of socket close, or the like. The TCP pattern recognizer 602 can be configured to detect that the pattern corresponds to the TCP closure retransmission category based on the historic pattern. In an example scenario, if the numbers of TCP FIN retransmissions exceeds the predefined threshold, then the TCP pattern recognizer 602 can be configured to detect that the pattern of the TCP packets are corresponding to the TCP closure retransmission category. The TCP pattern recognizer 602 can be configured to store the parameters of the TCP connection as the historic pattern.

The historical pattern is used for detecting whether the pattern of subsequent TCP packets corresponds to the TCP closure retransmission category. If the packets of the subsequent TCP connection correspond to the TCP closure retransmission category, the TO 600 can be configured to terminate the TCP connection. The TO 600 includes the TCP controller 606, which terminates the TCP connection.

Figure 12:
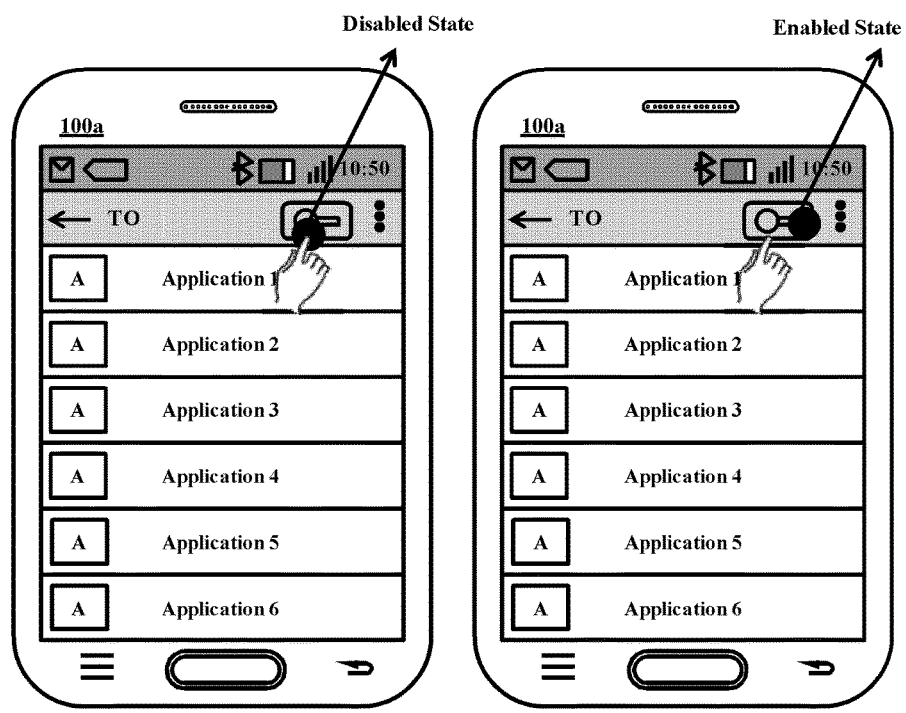
FIG. 12 illustrates an example user interface for controlling TCP retransmission, according to an embodiment as disclosed herein.

FIG. 12 illustrates an example user interface for controlling the TCP FIN retransmission, according to an embodiment as disclosed herein. As shown in the FIG. 12, the TO 600 in the mobile device 100a has to be enabled in order to control retransmissions of the FIN packets. The mobile device 100a provides the user interface 702, using which the TO 600 can be either enabled or disabled. The TO 600 also provides the user interface 702 for displaying the information related to overall battery saving, user application 102 connected to internet, type of internet connection (3G/4G/Wi-Fi), amount of power consumption and power saving by a particular user application 102, or the like.

Figure 13:
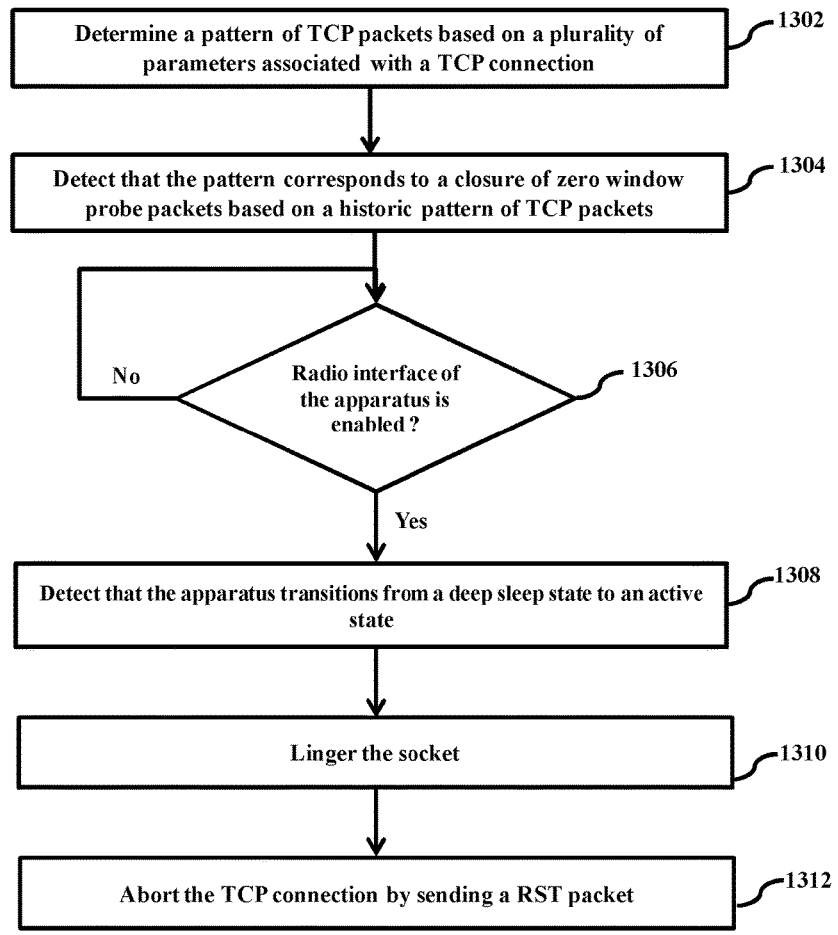
FIG. 13 is a flow chart illustrating a method for controlling TCP zero window probe packets by a TO, according to an embodiment as disclosed herein.

FIG. 13 is flow chart illustrating a method for controlling the TCP zero window probe packets by the TO 600, according to an embodiment as disclosed herein.

At step 1302, the method includes determining the pattern of the TCP packets based on the plurality of parameters associated with the TCP connection. The method allows the TO 600 to determine the pattern of the TCP packets based on the plurality of parameters associated with the TCP connection. In an embodiment, the pattern of the TCP packets is the number of TCP zero window probe packets.

In an embodiment, the parameters include at least one of the static parameters and the dynamic parameters. The static parameters include the IP address, the port number, the domain name, or the like. The dynamic parameters include the radio interface state, the server dynamics, the life time of the TCP connection, the connection interval, the type of socket close, or the like.

At step 1304, the method includes detecting that the pattern corresponds to the TCP zero window probes category based on the historic pattern of the TCP packets. The method allows the TO 600 to detect that the pattern corresponds to the TCP zero window probe closure category based on the historic pattern of the TCP packets. In an embodiment, the historic pattern of the TCP packets comprises information about IP address, information about port number, information about a domain name, information about a recreation time of the TCP connection and information about a type of closure.

If it is determined, at step 1306, that the radio interface 708 of the mobile device 100a is not enabled then, the step 1306 is performed. If it is determined, at step 1306, that the radio interface 708 of the mobile device 100a is enabled then, at step 1308, the method detects that the mobile device 100a transitions from a deep sleep state to an active state. The method allows the TO 600 to determine whether the mobile device 100a transitions from the deep sleep state to the active state. Once it is detected, at step 1008, that the mobile device 100a transitions from the deep sleep state to the active state then, at step 1310, the method includes lingering the socket. The method allows the TO 600 to linger the socket.

At step 1312, the method includes aborting the TCP connection by sending the RST packet. The method allows the TO 600 to abort the TCP connection by sending the RST packet.

The various actions, acts, blocks, steps, or the like in the flow chart may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 14:
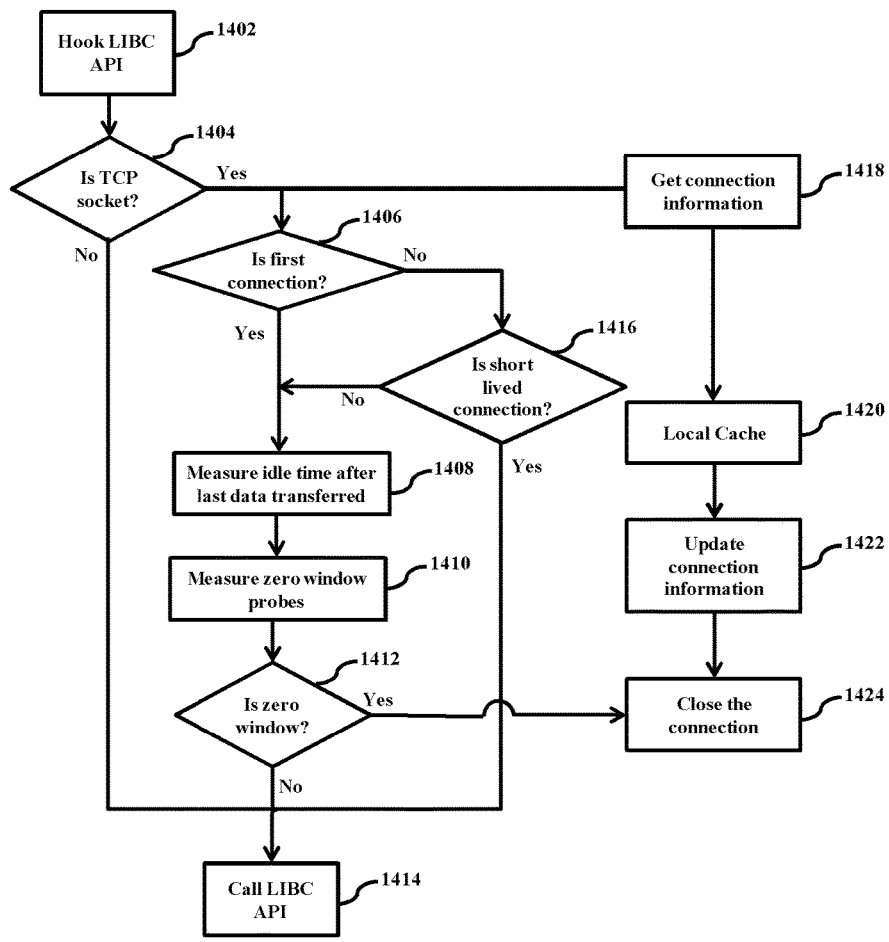
FIG. 14 is another flow chart illustrating a method for controlling TCP zero window probe packets by a TO, according to an embodiment as disclosed herein.

FIG. 14 is another flow chart illustrating a method for controlling the TCP zero window probe packets by the TO 600, according to an embodiment as disclosed herein. The mobile device 100a and the application server 100b exchange the respective buffer size through the TCP window size. When the mobile device 100a tries to stop the data flow from the application server 100b without closing the TCP connection, the mobile device 100a advertises the window size as zero, and the application server 100b stops sending further data to the mobile device 100a. If the mobile device 100a is inactive after zero window detection, the application server 100b starts sending TCP zero window probe packets periodically. Thereafter, post a pre-defined time, the application server 100b closes the TCP connection by sending a RST packet. This creates unnecessary power drain of the mobile device 100a by frequent radio wakeup to respond to the TCP zero window probe packets from the application server 100b.

As depicted in FIG. 14, at step 1402, the method includes hooking LIBC API. At step 1404, the method includes determining whether the socket is TCP. The hooking of socket library LIBC API such as socket, connect, close, or the like, is followed by determining whether a TCP stream socket is involved.

At step 1418, the method includes obtaining information relevant to the TCP connection. The TCP information includes static and dynamic parameters respectively. The API is used for filtering TCP connections and extracting the parameters of the TCP connection. The dynamic parameters consist of retransmission interval, retransmission count, radio interface state, server dynamics, application socket close delay, life time of the TCP connection, connection interval, type of socket close, and number of TCP zero window probe packets. The static parameters include IP address, port number, and domain name. The static parameters and the dynamic parameters allow the TCP packet pattern identification such as zero window probe and types of closure, short/long lived connections, or the like. At step 1420, the method includes storing the obtained TCP information in a local cache for reference. At step 1422, the method includes updating the information of the TCP connection. The saved information is reused for taking decision on TCP zero window probe packets.

Once it is determined that a TCP stream socket is involved, the information regarding the TCP connection is obtained from the local cache. At step 1406, the method includes determining whether the TCP connection is established for the first time. At step 1416, the method includes determining whether the TCP connection is short lived or long lived, in response to determining that the TCP connection is not established for the first time. If it is determined that the TCP connection is established for the first time, the method includes, at step 1408, includes measuring the idle time of the TCP connection. The idle time herein refers to the time since the last occurrence of data transfer between the application server 100b and the mobile device 100a. At step 1410, the method includes measuring the zero window probes. At step 1412, the method includes determining whether the TCP packets received are TCP zero window probe packets. The proposed method allows counting of number of TCP zero window probe packets from the application server 100b, which is followed by measuring the idle time of the TCP connection. If idle time is greater than a pre-defined threshold, at step, 1424, the TCP connection is terminated by the TCP zero window controller 606c.

In general scenarios of TCP communication, wherein the user application 102 actively sends and receives data and the TCP connection is terminated normally, the power usage of the TCP session is represented as follows:

$$P_{tcp\_session} = P_{radio-setup} + P_{tx-rx} + P_{tail}$$

wherein, $P_{tcp\_session}$ is P the total power consumption of the TCP session, $P_{radio-setup}$ is the power consumption for radio setup, $P_{tx-rx}$ is the power consumption for transmission of data packets $P_{tail}$ is the power consumption of tail state energy.

$P_{radio-setup}$ is the power consumption for radio setup, $P_{tx-rx}$ is the power consumption for transmission of data packets $P_{tails}$ the power consumption of tail state energy.

Considering this scenario, for n number of times, power utilization is represented as follows:

$$P_{i\ window\_probe} = \sum_{i=1}^{n} (P_{i\ radio\_setup} + P_{i\ window\_probe} + P_{i\ tail})$$

where $P_{iradio\ setup}$ is the total power consumption at $i^{th}$ radio wakeup, $P_{iwindowprobe}$ is the power consumption at $i^{th}$ TCP zero window probe packet transmission, $P_{itail}$ is the power consumption at $i^{th}$ tail energy state, n>1; i varies from 1 to n; for n number of TCP window probe packet transmission.

Applying the solution, the TCP sessions can be terminated before TCP zero window probe packet transmission is initiated. Hence the power saving in (n−1) scenarios is represented while considering average power loss due to radio wakeup and TCP window probe packet transmission as follows:

$$P_{avg_{window\_probe}} = \sum_{i=1}^{n} (P_{avg_{radio\_setup}} + P_{avg_{window\_probe}} + P_{avg_{tail}})$$

The ratio of power saving considering average power consumption as follows:

$$\frac{PS_{avg}}{P_{avg_{window\_probe}}} = \frac{n-1}{n}$$

$$\text{or } PS_{avg} = \frac{n-1}{n} * P_{avg_{window\_probe}}$$

wherein, $P_{avg\ close}$ is the average power consumption for a single TCP zero window probe packet transmission and $P_{s\ avg}$ is the average power saving by preventing transmission of (n−1) TCP zero window probe packets.

In an example scenario, if in a TCP session a total of 10 TCP zero window probe transmission takes place due to delayed closure of the mobile device 100a exceeding server timeout, due to exponential timeout nature of retransmission timeout, the first 5 zero window probe packet transmissions occurs within 10 seconds within the interval of 1, 2, 4, 8 seconds. There is no extra radio wakeup in this duration and the next successive 5 TCP zero window probe packets cause radio wakeup.

The various actions, acts, blocks, steps, or the like in the flow chart may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 15:
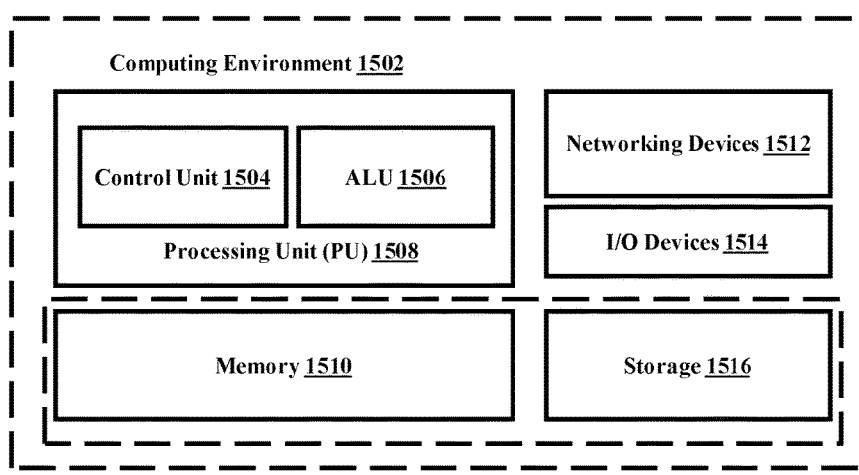
FIG. 15 illustrates a computing environment implementing the TO and method for controlling TCP packets, according to an embodiment as disclosed herein.

FIG. 15 illustrates a computing environment implementing the method for controlling the TCP packets by the TO 600, according to an embodiment as disclosed herein. As depicted in the FIG. 15, the computing environment 1502 comprises at least one processing unit 1508 that is equipped with a control unit 1504 and an Arithmetic Logic Unit (ALU) 1506, a memory 1510, a storage unit 1516, plurality of networking devices 1512 and a plurality Input output (I/O) devices 1514. The processing unit 1508 is responsible for processing the instructions of the technique. The processing unit 1508 receives commands from the control unit in order to perform the processing unit 1508's processing. Further, any logical and arithmetic operations involved in the execution of the instructions are computed with the help of the ALU 1506.

The overall computing environment 1502 can be composed of multiple homogeneous and/or heterogeneous cores, multiple CPUs of different kinds, special media and other accelerators. The processing unit 1508 is responsible for processing the instructions of the technique. Further, the plurality of processing units 1508 may be located on a single chip or over multiple chips.

The technique comprising of instructions and codes required for the implementation are stored in either the memory unit 1510 or the storage 1516 or both. At the time of execution, the instructions may be fetched from the corresponding memory 1510 or storage 1516, and executed by the processing unit 1508.

In case of any hardware implementations various networking devices 1512 or external I/O devices 1514 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 15 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for controlling transfer control protocol (TCP) packets by a device, the method comprising:
    obtaining a plurality of parameters associated with a first TCP connection;
    identifying a pattern of the first TCP connection corresponds to a retransmission of the TCP packets based on the obtained plurality of parameters;
    determining a historic pattern indicating a closure of the TCP packets based on information related to the first TCP connection;
    identifying a pattern of a second TCP connection corresponds to the closure of the TCP packets based on the historic pattern;
    if an abortion of the second TCP connection is required based on the identified pattern of the second TCP connection, aborting the second TCP connection by transmitting a TCP reset (RST) packet to a server; and
    if the abortion of the second TCP connection is not required based on the identified pattern of the second TCP connection, requesting a closure of the second TCP connection to the server by transmitting a TCP finish (FIN) packet,
    wherein the obtained plurality of parameters comprise a retransmission interval of the TCP packets and a retransmission count of the TCP packets.

2. The method of claim 1, wherein the obtained plurality of parameters further comprise at least one of a radio interface state, server dynamics, an application socket close delay, a life time of the TCP connection, a connection interval, a type of socket close, a quantity of zero window probes,
    an internet protocol (IP) address, a port number or a domain name.

3. The method of claim 1, wherein the TCP packets comprises TCP FIN packets or zero window probe packets.

4. The method of claim 3, wherein the historic pattern comprises at least one of information associated with internet protocol (IP) address, information associated with a port number, information associated with a domain name, information associated with a recreation time of the TCP connection or information associated with a type of closure, when the TCP packets are the TCP FIN packets; and
    wherein the historic pattern comprises information associated with the type of closure, when the TCP packets are the zero window probe packets.

5. The method of claim 1, further comprising:
    checking whether a radio interface is enabled; and
    checking whether a sleep state is transitioned to an active state in response to checking that the radio interface is disabled.

6. An apparatus for controlling transfer control protocol (TCP) packets, the apparatus comprising:
    a processor and a memory coupled to the processor, wherein instructions in the memory configured the processor to:
    obtain a plurality of parameters associated with a first TCP connection;
    identify a pattern of the first TCP connection corresponds to a retransmission of the TCP packets based on the obtained plurality of parameters;
    determine a historic pattern indicating a closure of the TCP packets based on information related to the first TCP connection;
    identify a pattern of a second TCP connection corresponds to the closure of the TCP packets based on the historic pattern;
    if an abortion of the second TCP connection is required based on the identified pattern of the second TCP connection, abort the second TCP connection by transmitting a TCP reset (RST) packet to a server; and
    if the abortion of the second TCP connection is not required based on the identified pattern of the second TCP connection, request a closure of the second TCP connection to the server by transmitting a TCP finish (FIN) packet,
    wherein the obtained plurality of parameters comprise a retransmission interval of the TCP packets and a retransmission count of the TCP packets.

7. The apparatus of claim 6, wherein the obtained plurality of parameters further comprise at least one of a radio interface state, server dynamics, an application socket close delay, a life time of the TCP connection, a connection interval, a type of socket close, a quantity of TCP zero window probe packets, an internet protocol (IP) address, a port number or domain name.

8. The apparatus of claim 6, wherein the TCP packets comprise TCP FIN packets or zero window probe packets.

9. The apparatus of claim 8, wherein the historic pattern comprises at least one of information associated with internet protocol (IP) address, information associated with a port number, information associated with a domain name, information associated with a recreation time of the TCP connection or information associated with a type of closure, when the TCP packets are the TCP FIN packets; and
    wherein the historic pattern comprises information associated with the type of closure, if the TCP packets are the zero window probe packets.

10. The apparatus of claim 6, wherein the processor is further configured to:
  check whether a radio interface is enabled; and
  check whether a sleep state is transitioned to an active state in response to checking that the radio interface is disabled.

* * * * *